US005651996A

United States Patent [19]

Roozdar

[11] Patent Number: 5,651,996
[45] Date of Patent: Jul. 29, 1997

[54] METHOD AND COMPOSITIONS FOR THE PRODUCTION OF CHLORINE DIOXIDE

[75] Inventor: Habib Roozdar, Nesconset, N.Y.

[73] Assignee: ARCO Research Co., Inc., Melville, N.Y.

[21] Appl. No.: 358,766

[22] Filed: Dec. 19, 1994

Related U.S. Application Data

[60] Division of Ser. No. 231,283, Apr. 22, 1994, Pat. No. 5,407,656, which is a continuation-in-part of Ser. No. 93,529, Jul. 19, 1993, Pat. No. 5,380,518, which is a continuation-in-part of Ser. No. 846,468, Mar. 4, 1992, abandoned, and Ser. No. 980,262, Nov. 23, 1992, abandoned.

[51] Int. Cl.⁶ .......................... A01N 59/00; A61K 33/20; C01B 11/02
[52] U.S. Cl. .................... 424/665; 424/661; 423/472; 423/477; 252/187.21; 422/29; 514/693; 514/698; 514/705
[58] Field of Search .................... 424/661, 665; 514/693, 698, 705; 423/477, 472; 252/187.21; 422/29

[56] References Cited

U.S. PATENT DOCUMENTS

| 2,323,594 | 7/1943 | Hampel | 423/477 |
|---|---|---|---|
| 3,386,915 | 6/1968 | Rutschi et al. | 423/477 |
| 3,816,077 | 6/1974 | Fuller et al. | 422/189 |
| 4,084,747 | 4/1978 | Alliger | 424/65 |
| 4,104,190 | 8/1978 | Hartshorn | 423/477 |
| 4,330,531 | 5/1982 | Alliger | 424/661 |
| 4,731,193 | 3/1988 | Mason et al. | 252/95 |
| 4,861,514 | 8/1989 | Hutchings | 252/187.21 |
| 4,891,216 | 1/1990 | Kross et al. | 424/661 |
| 4,925,645 | 5/1990 | Mason | 423/477 |
| 4,956,184 | 9/1990 | Kross | 424/661 |
| 4,986,990 | 1/1991 | Davidson et al. | 424/665 |
| 4,999,025 | 3/1991 | Patton | 8/111 |

FOREIGN PATENT DOCUMENTS

| 0959238 | 12/1974 | Canada. |
| 8504107 | 9/1985 | WIPO. |
| 8808823 | 11/1988 | WIPO. |

OTHER PUBLICATIONS

P. 67 (Alcohols, Aldehydes and Aliphatic Ketones) in "Reactions with Organic Compounds" from *Chlorine Dioxide Chemistry and Environmental Impact of Oxychlorine Compounds*, by W.J. Masschele, Edited by Rip G. Rice, Published by Ann Arbor Science, 1979.

*Primary Examiner*—John Pak
*Attorney, Agent, or Firm*—McAulay Fisher Nissen Goldberg & Kiel, LLP

[57] ABSTRACT

The present invention relates to a method for producing chlorine dioxide ($ClO_2$) disinfecting solution which preferably minimizes the amount of residual chlorite ion ($ClO_2^-$) so that the disinfecting solution can be used in a number of industries, preferably including the food, food processing, drinking water, pharmaceutical production, medical and dental industries. Chlorine dioxide generating solutions which are substantially corrosion free as well as gel formulations are also disclosed.

3 Claims, 2 Drawing Sheets

METHOD AND COMPOSITIONS FOR THE PRODUCTION OF CHLORINE DIOXIDE

RELATED APPLICATIONS

This is a division of application Ser. No. 08/231,283 filed Apr. 22, 1994, which is now U.S. Pat. No. 5,407,656, which is a continuation-in-part application of U.S. patent application Ser. No. 08/093,529, entitled "Method for the Production of Chlorine Dioxide", filed Jul. 19, 1993, which is now U.S. Pat. No. 5,380,518, which is a continuation-in-part application of U.S. patent application Ser. No. 07/846,468, entitled "Method for the Production of Chlorine Dioxide", filed Mar. 4, 1992, now abandoned, and a continuation-in-part application of U.S. patent application Ser. No. 07/980,262, entitled "Chlorine Dioxide Generation Method in Low Acidity Compositions", filed Nov. 23, 1992, now abandoned.

FIELD OF THE INVENTION

The present invention relates to a method for maximizing the production of chlorine dioxide ($ClO_2$) disinfecting solution which method also preferably minimizes the amount of residual chlorite ion ($ClO_2-$). Preferably, the disinfecting solution can be used in a number of related industries, including the food, food processing, drinking water, pharmaceutical production, medical and dental related industries.

In a related embodiment, the present invention also relates to a method for the generation of chlorine dioxide ($ClO_2$) in low acidity disinfecting compositions (i.e., having an initial pH between about 3.5 and about 4.5–5.0) which is suitable for applications where corrosion, a pH related property, is a concern and is required to be either prevented or minimized so that the disinfecting composition can be used in the treatment of metal-containing substrates such as dental and medical instruments and devices.

A further embodiment relates to chlorine dioxide generating formulations in gel form for the topical administration of chlorine dioxide to the epidermis, i.e., skin of animals and humans. In the gel formulations according to the present invention, in order to maximize chlorine dioxide production for purposes of disinfecting the skin or producing an intended pharmacological effect, an initial pH (which initial pH may be the result of the inclusion of an acid and an aqueous soluble salt of chlorite, or optionally, a hydroxyl-free aldehyde disproportionation agent—which addition to the acid and chlorite salt generally does non affect the pH of the solution) of about 3.0 to about 4.5 is used. This pH range is consistent with the safe and effective topical delivery of gel formulations according to the present invention.

BACKGROUND OF THE INVENTION

Chlorine dioxide, an indirect food additive, has been found to be especially useful as a disinfectant, antiseptic and sanitizer. It is widely used to disinfect drinking water and various water supplies. In addition, chlorine dioxide finds use as a bleaching agent for flour, fats textiles and as an antiseptic. In addition, chlorine dioxide exhibits great benefit as a disinfectant, for example, an antimicrobial, for treating a number of skin conditions of mammals, including humans.

Although it has great beneficial characteristics, chlorine dioxide can not be transported commercially as a concentrated gas for its use and instead has been generated at the site where it is used.

Chlorine dioxide has shown great utility as an antiseptic for treating metal substrates such as dental and medical instruments and devices. However, the prior art methods for generating chlorine dioxide suffer from the disadvantage that large quantities of chlorite remain as a residue. Chlorite residues on food handling equipment and medical and dental surfaces that are to come in contact with humans are to be avoided or substantially minimized according to FDA and EPA regulations. In addition, in topical chlorine dioxide generating formulations, the large chlorite residues which remain using the prior art methods is a problem because of the tendency of the formulations to produce an irritation and allergic responses.

Separately, chlorine dioxide exhibits certain corrosive properties which are believed to be pH related, especially low pH related. Thus, in certain applications, it is beneficial to generate chlorine dioxide at a pH which would avoid or minimize corrosion during the disinfecting process.

The production of $ClO_2$ solutions is well known in the art. The general prior art procedure has been to mix sodium chlorite ($NaClO_2$) with an acid. As a rule, the stronger the acid, the faster and more efficient will be the production of chlorine dioxide. The general formula for the production of chlorine dioxide using sodium bisulfate is as follows:

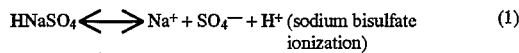  (1)

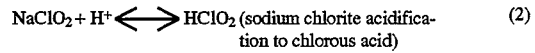  (2)

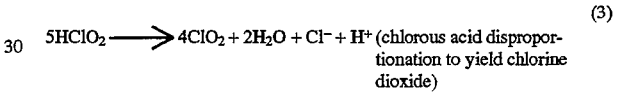  (3)

or

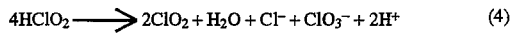  (4)

According to the reaction, the hydrogen ion concentration produced is much greater using a relatively strong acid, as opposed to a weaker acid (having a lower pKa). This increased hydrogen ion concentration will produce optimal concentrations of chlorous acid. Thus, lower concentrations of strong acids are needed to generate the same concentration of chlorous acid as are produced using weaker acids.

The prior art methods for generating chlorine dioxide result in large residues of chloride ion. This can be a disadvantage where one wishes to minimize the residual chloride ion, especially when disinfecting or cleaning sensitive machinery or equipment. Thus, when the prior art solution is evaporated from the surface of food equipment, for example, the chlorine ion either in protonated form or as the conjugate base (depending upon pH) remains as unwanted residue.

Another requirement in the food handling and related industries is the need for raw materials or ingredients which are safe to handle in the preparation of the disinfectant. Strong acids such as nitric or hydrochloric may be dangerous to the unskilled personnel in the food handling unit and inappropriate for generating chlorine dioxide in this case. The requirement is for the inclusion of reagents which are safe to use and, after generating chlorine dioxide, produce side products which are non-toxic and/or biodegradable.

Gel formulations which produce chlorine dioxide for topical delivery are known in the art. These prior art formulations however, suffer from certain limitations. For one, these formulations produce only limited concentrations of chlorine dioxide. Second, these formulations are not efficient and residual chlorite is a problem. High concentrations of residual chlorite are believed to be at least partially responsible for untoward irritation and allergic responses which have characterized the prior art gel compositions. Other components of the prior art gel formulations which remain include organic acids, which, within the desired pH range for topical delivery, are primarily in the form of the free acid. The free acid form of the organic acids of the prior art compositions tends to more readily penetrate the skin than does the anionic counter ion of the acid. Consequently, the use of high pKa organic acids such as are used in prior art gel formulations tend to exacerbate skin irritation problems and should be avoided.

Although a number of attempts have been made in the art to enhance the efficiency of chlorine dioxide production and minimize the amount of residual chlorite ion, the results have generally been unimpressive. To date, there has been no report of the use of a hydroxyl free aldehyde to enhance the production of chlorine dioxide from an acid and a salt of chlorite at a pH of less than about 5.0.

OBJECTS OF THE PRESENT INVENTION

It is an object of the present invention to provide a method for producing chlorine dioxide for use on food equipment and related surfaces including dental and medical surfaces.

It is another object of the present invention to preferably minimize the amount of residual chlorite salt in the final chlorine dioxide solution and ultimately, where applicable, on the treated surface.

It is an additional object of the present invention to provide a method for producing chlorine dioxide utilizing materials which are safe to handle.

It is a further object of the present invention to generate chlorine dioxide from chlorine ion and minimally toxic or non-toxic (substantially non-toxic) chlorine dioxide generators which yield substantially non-toxic and/or biodegradable side products from the generation of chlorine dioxide.

It is still an additional object of the present invention to provide a method for generating chlorine dioxide which enhances the production of chlorine dioxide while minimizing the residual chlorite ion.

It is yet another object of the present invention to generate chlorine dioxide from chlorite ion in a liquid or gel composition utilizing non-toxic low pKa acids.

It is yet a further object of the present invention to provide a chlorine dioxide generation method in a liquid composition containing a relatively low concentration of acid which may be used as a disinfectant having essentially no corrosive properties.

It is still a further object according to the present invention to provide chlorine dioxide generating compositions in gel form for topical delivery to the epidermis of animals or the skin of humans. These chlorine dioxide gel formulations of the present invention are capable of delivering high concentrations of chlorine dioxide safely to a topical site to be used as a skin disinfectant or to treat a number of conditions of the skin, including microbial and fungal infections, among others.

These and other objects of the present invention may be readily gleaned from the description of the invention which follows.

BRIEF DESCRIPTION OF THE DRAWINGS

In FIG. 2 (*a* and *b*), the two parts could be considered as two separate containers, with or without dispensing pumps. A measuring cup can be used for removing approximately equal volumes of the chlorite part and the acid part.

DETAILED DESCRIPTION OF THE INVENTION

Figure 1:
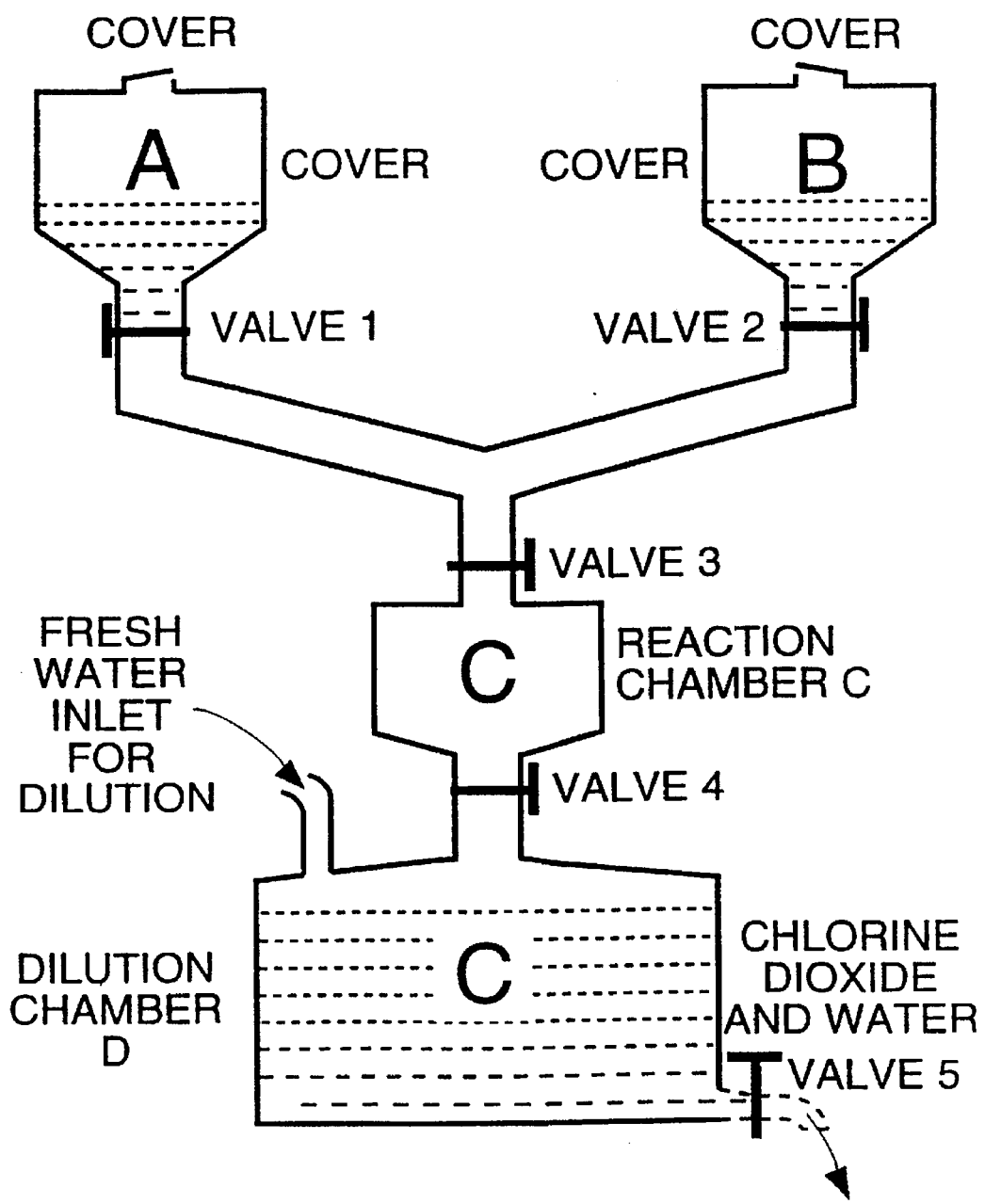
FIG. 1 is a diagrammatic representation of a system for producing chlorine dioxide from a salt of a chlorine and an acid, preferably a biologically compatible acid and optionally, a disproportionation agent. The reaction(s) to form chlorine dioxide occurs in the reaction chamber (C). It is noted that the pipes, chambers and vats as set forth in FIG. 1 are generally made of high density polyethylene and/or polypropylene.

The term "salt of a chlorite" or "chlorite salt" is used throughout the specification to describe a salt of chlorite which is readily soluble in an aqueous system and which readily dissociates into chlorite anion and counterion (generally, metal). Two particularly preferred salts of chlorites for use in the present invention include sodium chlorite and potassium chlorite.

The term "acid" is used throughout the specification to describe protic acids, i.e., acids that release hydrogen ions in solution. Acids for use in the present invention include strong inorganic acids such as hydrochloric, sulfuric, sulfamic and nitric acid, preferably as dilute acid, organic acids such as citric, fumaric, glycolic, lactic, malic, and tartaric acid, among others, and preferred acids such as sodium and potassium bisulfate ($NaHSO_4$ and $KHSO_4$), phosphoric acid and maleic acid.

The term "low pKa acid", "non-toxic low pKa acid" "biologically compatible low pKa acid" is used throughout the specification to describe acids which are relatively strong (have pKa's of about 2.1 or lower, preferably below about 1.94, the pKa of chlorous acid so as to shift the equilibrium to chlorous acid generation) and are easily or relatively safely handled, are generally compatible with biological systems (they are substantially non-toxic) and are non-caustic. Low pKa acids donate a large fraction of hydrogen ions by favoring the reaction which consumes hydrogen ions and generates chlorine dioxide. By virtue of the low pKa, the acids utilized in the present invention are highly ionized and smaller quantities of the low pKa acid would be needed to protonate chlorite ions to form chlorous acid compared to higher pKa acids. Consequently, the acids have low residual levels and the mixture is easily raised in pH when touching skin or disinfecting an instrument.

In non-corrosive and gel formulation aspects according to the present invention, the use of a low pKa acid within a range of pH of about 3.0 to about 4.0–4.5 in combination with a salt of chlorite and a hydroxyl-free aldehyde is preferred and is consistent with the substantial absence of the free acid form of the low pKa acid in solution. The substantial absence of the free acid form is consistent with compositions which exhibit little, if any, corrosive characteristics and produce little, if any, irritation of the skin.

The residues that are formed from these biologically compatible acids are generally the sodium and/or potassium salts of the acids, such residues being safe, non-corrosive and acceptable as either director indirect food and/or pharmaceutical additives. Examples of biologically compatible or non-toxic acids for use in the present invention include sodium and potassium bisulfate ($NaHSO_4$ and $KHSO_4$), phosphoric acid, sulfamic acid and maleic acid. The bisulfates have pKa's of about 1.9–2.0, phosphoric acid has a pKa of about 2.15 and maleic acid has a pKa of about 1.94. Other biologically compatible acids which may be used in the present invention include phosphoric acid, ethylenediaminetetraacetic acid (EDTA, as the free acid or the monosodium salt), among others.

For purposes of the present invention, hydrochloric, nitric and concentrated sulfuric acid or sulfuric acid in its free acid form may also be used in the present invention, but their use is generally limited compared to the biologically compatible acids. In certain embodiments according to the present invention, these acids are preferably used in diluted form.

The term "chlorous acid disproportionation agent", "disproportionation agent" or "aldehyde agent" is used throughout the specification to describe a number of disproportionation agents which enhance the raze of disproportionation of chlorous acid to significantly increase the amount of chlorine dioxide which is produced and minimize residual chlorite ion. The disproportionation agents according to the present invention are chosen for their ability to substantially enhance the rate and efficiency (yield) at which chlorine dioxide is formed from chlorous acid (even at relatively high pH's and low concentrations of acid- a consideration in the embodiments which minimize corrosion), for their ability to form their biologically compatible substantially non-toxic organic acid side products and for their ability to minimize residual chlorite ion. Thus, by using a disproportionation agent according to the present invention, one can produce effective quantities of $ClO_2$, minimize the amount of acid used and raise the pH of the $ClO_2$-generating solution to a non-corrosive level, if desired.

Disproportionation agents for use in the present invention preferably include hydroxyl free aldehydes, most preferably, substantially non-toxic hydroxyl free aldehydes such as acetaldehyde, benzaldehyde, glutaraldehyde, cinnamic aldehyde, propionaldehyde, paraldehyde and 2-Furfural (bran oil), among others.

Preferred disproportionation agents for use in the present invention include those aldehydes that are substantially non-toxic themselves and which are converted during the disproprotionation process to substantially non-toxic side products. The hydroxyl free aldehydes acetaldehyde, benzaldehyde, glutaraldehyde and propionaldehyde are particularly preferred for use in the present invention. Hydroxyl free aldehyde compounds are preferred over hydroxyl containing aldehyde compounds for use in the present invention, because of the tendency of the hydroxyl containing aldehydes to undergo condensation in solutions at low pH, which decreases the rate of formation of chlorine dioxide.

The term "hydroxyl free aldehyde" is used throughout the specification to describe the preferred disproportionation agents for use in the present invention. Hydroxyl free aldehydes are those chemical compounds containing an aldehyde moiety which is free of hydroxyl groups. While non being limited by way of theory, it has quite unexpectedly been discovered that the inclusion of a hydroxyl free aldehyde in combination with an acid and a salt of chlorite (at a pH of less than about 5.0, more preferably less than about 4.5) will maximize the production of chlorine dioxide and minimize the residual chlorite compared with the prior art methods, especially including those methods which use vicinal hydroxyl containing hemi-acetal compounds such as aldoses and other sugars.

The term "corrosive properties" is used throughout the specification to describe properties such as those producing corrosion on metal substrates such as medical and/or dental devices. These properties are derived from factors such as excess residual acidity (low pH) and/or excess residual chlorite ion.

The term "enhanced chlorous acid disproportionation" is used throughout the specification to describe the production of chlorine dioxide from chlorous acid in the presence of a hydroxyl free aldehyde disproproportionation agent, a combination which has a faster rate and greater efficiency of chlorite ion use even when the pH is less acidic and which generally produces chlorine dioxide in greater amounts and at higher concentrations than without a disproportionation agent. This is an unexpected result. In general, in the absence of a disproportionation agent, the amount of chlorine dioxide which is generated in a reaction at a pH of about 3.9 during a 15 minute period is generally no greater than about 1–2 parts per million. This indicates that the rate of conversion of chlorous acid to chlorine dioxide in this case is very slow and the yields are low. In addition, residual acid remains, thus increasing the potential for producing corrosion.

Utilizing a disproportionation agent in the form of a hydroxyl free aldehyde at the same starting pH of 3.9, the concentration of chlorine dioxide generated in a period of about ten minutes or less may be as much as about 40 ppm or more. In this case, hydrogen ions and residual chlorite ions are consumed by the disproportionation of chlorous acid, such that at the end of a 15 minute period, the pH rises to about 4.3. In certain cases the concentration of chlorine dioxide generated may be as much as 100 ppm or more. This more efficient process for producing chlorine dioxide results in chlorite ion levels being substantially reduced relative to processes which generate chlorine dioxide in the absence of a hydroxyl free aldehyde. In preferred embodiments according to the present invention, at the end of the 15-minute period, the residual chlorite ion levels are about 60% or less of the initial chlorite ion.

In the present invention, it has surprisingly been found that the inclusion of a hydroxyl-free aldehyde disproprotionation agent in combination with an acid and a salt of chlorite in a first aqueous solution will generate within a period of about ten minutes at least about two times, preferably at least about 4 times and as much as ten or more times the concentration of chlorine dioxide generated in a second solution containing the same concentration and type of acid and salt of chlorite, but including an aldose as disproportionation agent at the same concentration that the aldehyde was used in the first solution. This is a particularly surprising result inasmuch as the prior art (U.S. Pat. No. 4,986,990 to Davidson, et al.) teaches that the inclusion of disproportionation agents at an acidic pH should be in the form of a vicinal hydroxyl containing composition.

The terms "minimize residual chlorite ion", "minimizing residual chlorite ion" or "substantially reduce residual chlorite ion" are used throughout the specification to describe reactions to produce chlorine dioxide which preferably yield no more than about 85% by weight residual chlorite ion (based upon the initial weight of chlorite used). More preferably, the amount of residual chlorite ion is less than about 70% by weight and most preferably the amount of residual chlorite ion is less than about 60% by weight. In certain instances, the amount of residual chlorite ion may be considerably less than about 30% by weight.

The term "substantially non-toxic" is used throughout the specification to describe disproportionation agents and/or biologically compatible acids which are used to generate chlorine dioxide in the method(s) according to the present invention. Substantially non-toxic means that the materials are safely handled and are generally compatible with biological systems in amounts used to generate chlorine dioxide relative to compositions which are considered "substantially toxic." The term "substantially" is used to describe the non-toxic acids and disproportionation agents for use in the present invention because of the fact that almost all substances, including water, may become toxic to a biological system in certain amounts.

The term "substantial quantity" is used to describe amounts of chlorine dioxide which are produced using the method according to the present invention and are believed to be useful. A substantial quantity of chlorine dioxide for purposes of the present invention is at least about 1 part per million, because chlorine dioxide is a disinfectant at that concentration and higher concentrations. In the present invention, chlorine dioxide is preferably produced in a concentration of at least about 5 parts per million, most preferably in a concentration of at least about 20–40 parts per million. Concentrations of chlorine in excess of 100 parts per million are readily available using the present invention.

The terms "low acidity composition" and "high pH acid composition" are used throughout the disclosure to describe a chlorine dioxide-generating composition (producing at least about 1 ppm chlorine dioxide) and having a relatively low concentration of acid to produce an initial pH of about 3.5 to about 4.5–5.0, and which comprises an amount of a water soluble salt of chlorite with an amount of an acid, preferably a low pKa acid, effective to produce a pH within the above range. The composition may be dry or in solution.

The term "chlorite part" is used throughout the specification to describe the form in which an amount of a water soluble salt of chlorite either in dry or liquid state is added to the acid part.

The term "acid part" is used throughout the specification to describe the form in which an amount of a water soluble low pKa acid either in dry or liquid state is added to the chlorite part.

The term "low acidity condition" is used throughout the specification to describe the condition at which at least 1 part per million (ppm) of chlorine dioxide is generated in a solution with a starting pH ranging from about 3.5 to about 4.5–5.0. This condition is provided by combining an effective amount of a low pKa acid with an amount of a water soluble salt of chlorite.

The overall pH range for purposes of the present invention is from less than about 2.0 to about 5.0, most preferably about 2.0 to about 4.5. In the case of topical gel formulations, the pH ranges from slightly less than about 3.0 to about 5.0 (i.e., compatible with topical delivery to an animal or human or no less than about pH 2.5), preferably about 3.0 to about 4.5. In the case of non-corrosive or "low acidity" solutions for use in disinfecting medical and dental instruments, the pH ranges from about 3.5 to about 4.5–5.0.

The term "effective amount" is used throughout the specification to describe a minimum amount, quantity or concentration of a component, i.e., an acid (preferably, a low pKa acid), disproportionation agent or chlorite ion included to generate an intended effect, i.e., a concentration of chlorine dioxide. The term effective amount when used to describe the acid, preferably a low pKa acid, is used to describe that amount of acid, either in dry or liquid form which, when combined with chlorite in solution, will generate a desired concentration of chlorine dioxide, i.e., at least about 1 part per million (ppm) and preferably at least about 5 ppm of chlorine dioxide from chlorous acid. By definition, 1 part per million is equal to 0.0001% by weight.

The term "gel composition" or "gel" is used to describe an aqueous composition according to the instant invention which includes an amount of a gelling agent effective for gelling the composition. Gel compositions are preferred for topically delivering chlorine dioxide to a site in need of disinfection or chlorine dioxide therapy. In general, the amount of a gelling agent included in the aqueous chlorine dioxide generating compositions according to the present invention ranges from about 0.5% to about 5–6% (or more) by weight of the composition, with a preferred amount of gelling agent falling within the range of about 1% to about 4% by weight.

Gelling agents for use in the present invention include, for example, natural and synthetic gelling agents including polysaccharides extracted from plants such as pectins found in green land plants and carrageenans, agars found in seaweeds, and polysaccharides extracted from legume seeds, such as the galactomannans, including guar gum and locust bean (carob) gum. Other gelling agents include high molecular weight polyoxyalkylene crosslinked acrylic polymers as well as the highly preferred cellulosics such as hydroxymethyl cellulose, hydroxypropyl cellulose, hydroxyethyl cellulose, among others including high molcuelar weight polyethylene glycols, polyvinyl alcohol-boric acid gels, polyacrylamide gels and crosslinked polyvinylpyrrolidones, among others. The gelling agents according to the present invention are sterilized prior to inclusion in the instant formulations. It is preferred that the gelling agent should be stable to pH's ranging from less than about 2 to greater than about 10 so that they can be used in all formulations (including Parts A and B which are mixed to generate chlorine dioxide).

The present invention relates to a method of producing chlorine dioxide comprising:

1) combining an amount of a salt of chlorite with an amount of an acid, preferably a low pKa biologically compatible acid effective to produce a substantial quantity of chlorous acid; and 2) providing an amount of a disproportionation agent in the form of a hydroxyl free aldehyde chemical compound effective to enhance chlorous acid disproportionation to chlorine dioxide, the initial pH of the composition containing the salt of chlorite, the acid and aldehyde compound being less than about 5.0.

This method unexpectedly enhances the rate and amount of chlorine dioxide produced and reduces the amount of residual chlorite ion relative no prior art methods and is preferably compatible with food, medical device and dental surfaces. This method may be performed at an initial pH no greater than about 5.0 and preferably within a pH range of about 2 to about 4.5. In the case of gel compositions, the initial pH preferably ranges from about 3.0 to about 4.5. Where corrosion resistance is not desired, a pH of less than about 2.5 is preferred, because high concentrations of chlorine dioxide may be generated and residual chlorite concentrations are quite low (in certain circumstances, less than about 10–30%). In certain embodiments according to the present invention, substantial corrosion resistance is instilled by utilizing an initial pH of about 3.5 to about 4.5 in combination with an inorganic acid.

The present invention also relates to a method of producing chlorine dioxide comprising:

1) combining an amount of a salt of chlorite with an amount of an acid, preferably a low pKa biologically compatible acid, effective to produce a substantial quantity of chlorous acid; and 2) providing an amount of a disproportionation agent in the form of a non-toxic hydroxyl free aldehyde chemical compound effective to enhance chlorous acid disproportionation to chlorine dioxide, said aldehyde after disproportionation giving rise to a substantially non-toxic organic acid and/or organic acid salt side product.

In a preferred method according to the present invention which provides substantial corrosion resistance, lower concentrations of acid, preferably a low pKa inorganic acid and chlorite are used at a pH ranging from about 3.5 to about 5.0, preferably about 3.5 to about 4.5 compared to prior art methods, further diminishing the residual chlorite ion. Gel formulations according to the present invention make use of a pH ranging from about 3.0 to about 4.5. It is noted that the initial pH of the formulation is that pH generated when acid and chlorite salt are combined. However, the initial pH described above is also applicable to compositions or formulations which include a hydroxyl-free aldehyde, the aldehyde being a neutral species which does not appreciably alter or otherwise change the initial pH of the formulations which contain acid and chlorite salt.

It has been discovered unexpectedly that the inclusion of a low pKa inorganic acid in combination with chlorite and a hydroxyl free aldehyde at an initial pH of about 3.5 to about 5.0, preferably about 3.5 to about 4.5 to produce chlorine dioxide will reduce corrosion of metal substrates. While not being limited by way of theory, the choice of a low pKa inorganic acid is believed to be preferred to minimize corrosion because of the tendency of the low pKa acid to be ionized within the pH range of about 3.5 to 5.0, thus minimizing the free acid form of the acid, and consequently, the corrosion.

In the first method according to the present invention, an effective amount of a salt of a chlorite, preferably sodium or potassium chlorite is combined with a biologically compatible acid to produce a substantial quantity of chlorous acid. In a second step, the chlorous acid produced is allowed to disproportionate to form chlorine dioxide. Chlorine dioxide pursuant to the present invention may be generated in a step-wise manner, or alternatively, may be generated from the acid, chlorite salt and aldehyde being combined at the same time.

In the method according to the present invention, preferred salts of chlorites include sodium and potassium chorite. The preferred acids are low pKa acids according to the present invention which are generally considered safe, user friendly and substantially non-toxic, for example salts of bisulfate, sulfamic acid, maleic acid, phosphoric acid and ethylenediaminetetraacetic acid (EDTA, as the free acid or the monosodium salt), among others. It is noted that numerous additional acids may be used in the present invention to generate chlorine dioxide including numerous organic acids, for example, citric, propionic, fumaric, glycolic, lactic, malic, tartaric and acetic, among others and inorganic acids such as sulfuric, sulfamic, hydrochloric and nitric (preferably, in a dilute concentration). Generally, the concentration of chlorite salt used to generate chlorous acid in the present invention represents at least about 0.005M and preferably ranges from about 0.002M to about 0.5M or slightly higher. In the embodiments which are substantially non-corrosive, the amount of chlorite salt comprises at least about 0.005M and preferably ranges from about 0.002M to about 0.2M.

The amount of acid, preferably biologically compatible acid, added to the chlorite salt is generally that amount effective to provide an initial pH of the reaction mixture (which mixture includes acid and chlorite salt or preferably, acid, chlorite salt and aldehyde, among other components) below about 5.0, preferably below about 4.5 and more preferably lower than about 3.5 or less. In embodiments according to the present invention where corrosion resistance is not considered important, preferably, as a rule of thumb, the low pKa acid is added in an amount which will render the initial pH in the reaction chamber, i.e., in the presence of chlorite ion and aldehyde, to a level below about 2.5 and most preferably to a level at or below about 2.2. In embodiments according to the present invention in which the corrosion resistance is desired, the initial pH generally ranges from about 3.5 to about 5.0, preferably about 3.5 to about 4.5. In gel formulations according to the present invention, the initial pH of the formulation which includes acid, chlorite salt and optionally, aldehyde ranges from about 3.0 to about 4.5.

The acid is generally provided in a concentration of about 0.00005M to upwards of about 1M, depending upon the final pH of the solution desired. In corrosion resistant compositions, the concentration of acid preferably ranges from about 0.01M to about 0.2M, depending upon the amount of chlorite in the composition. In compositions in which having the characteristic of corrosion resistance is not important, the amount of acid preferably ranges from about 0.01M to upwards of 1M or more. These concentrations will usually provide a pH of less than about 2.5 and usually less than about 2.0. A low pH value is generally associated with a greater rate and production of chlorine dioxide. Concentrations of acid producing pH's above or below these values (up to a pH of about 5.0) may also be used, depending upon the amount of chlorite no be converted to chlorine dioxide, as well as the pH desired in the reaction chamber and the ultimate concentration of chlorine dioxide desired.

In the first method according to the present invention, the chlorite salt is combined with the acid preferably at about 15° C. to about 30° C. to produce chlorous acid. Thereafter, the chlorous acid is left to disproportionate to chlorine dioxide. In general, the disproportionation step is carried out in the same aqueous medium where the formation of chlorous acid occurs. The temperature of the disproportionation step may vary, but will generally range from about 15° C. to about 30° C. or higher. After production, the chlorine dioxide solution may be used directly or diluted depending upon the desired or intended use.

In a second method according to the present invention, the use of a disproportionation agent, preferably in the form of a hydroxyl free aldehyde chemical composition, will enhance and hasten the production of chlorine dioxide from chlorous acid. In this aspect of the present invention, either before, during or after the formation of chlorous acid, an effective amount of an agent for disproportionating chlorous acid to chlorine dioxide is added to the solution. While the disproportionation agent may be added after the formation of chlorous acid, preferably the disproportionation agent is already present in the acid solution when the acid solution is combined with the aqueous mixture of chlorite salt. The inclusion of the aldehyde disproprotionation agent does not appreciably affect the pH of the initial solution which includes acid and chlorite salt, because the aldehyde is a neutral species. By combining the aldehyde disproprotionation agent initially with acid and chlorite salt in this way, as soon as chlorous acid is generated, the disproportionation reaction may be enhanced. The overall result will be to shift the equilibrium toward more chlorous acid generation and consequently, more chlorine dioxide formation. Using a disproportionation agent, at least 10% and generally at least about 30–40% up to about 80% or higher of chlorite ion is converted to chlorine dioxide and chloride ion. In the absence of a disproportionation agent such as a hydroxyl free aldehyde disproportionation agent, the conversion is significantly slower and is less efficient (often, significantly less than about 2% of the initial chlorite ion is converted to chlorine dioxide and/or chloride). The significant enhancement of chlorine dioxide production and the limitation in residual chlorite ion using a hydroxyl free aldehyde disproportionation agent is an unexpected result.

It is noted that in this aspect of the present invention which utilizes a hydroxyl free aldehyde disproportionation agent to enhance chlorous acid disproportionation to form chlorine dioxide and minimize residual chlorite, any acid which produces an initial pH in the reaction mixture of about 5.0, preferably 4.5 or lower may be utilized, but preferably a low pKa biologically compatible acid is used. In this regard, the following acids, among other are useful: salts of bisulfate, maleic acid, sulfamic acid, phosphoric acid and ethylenediaminetetraacetic acid (EDTA, as the free acid or the monosodium salt), are most preferred. Numerous additional acids may also be used in the present invention to generate chlorine dioxide including a variety of organic acids, for example, citric, propionic, fumaric, glycolic, lactic, malic, tartaric and acetic, among others and inorganic acids such as sulfuric hydrochloric and nitric (preferably, in a dilute concentration), among others.

In one aspect of the present invention, a eel matrix is described. The gel matrix according to the present invention is intended for use on mamaalian skin, preferably human skin, as a delivery vehicle for chlorine dioxide in disinfecting amounts. In the present invention, the use of certain chemical components which produce chlorine dioxide according to the instant invention are particularly useful in a gel matrix for delivering chlorine dioxide.

The present invention which relates to a topical gel formulation preferably utilizes a low pKa acid selected from the group consisting of an aqueous soluble bisulfate salt, maleic acid, phosphoric acid, ethylenediaminetetraacetic acid, monosodium ethylenediaminetetraacetic acid and mixtures thereof and an aqueous soluble salt of chlorite in combination with an aldehyde disproprtionation agent selected from the group consisting of acetaldehyde, benzaldehyde, propionaldehyde, glutaraldehyde and 2-furfural at an initial pH ranging from about 3.0 to about 4.5. This combination of additives in aqueous solution is combined with a gelling agent, the gelling agent being included in an amount effective to produce a gel for topical delivery of the formulation. This combination of ingredients as disclosed herein at an initial pH of about 3.0 to about 4.5 is consistent with the rapid formation and delivery of high concentrations of chlorine dioxide (i.e. at least about 10 ppm, preferably at least about 25 ppm and most preferably at least about 50 ppm or more for topical applications of chlorine dioxide). In many instances the production of 100 or more ppm of chlorine dioxide is readily attainable. This is not easily attained by the gel formulations of the prior art. While acids other than low pKa acids may be used, the low pKa acids are clearly preferred for use in the present gel formulations.

Compared to the prior art methods, the gel compositions according to the present invention produce concentrations of chlorine dioxide within a period of no greater than about ten minutes in amounts of at least two, preferably at least five and most preferably ten or more times the concentration of chlorine dioxide produced from virtually identical chllorine dioxide generating compositions wherein an aldose of the prior art is substituted for the hydroxyl-free aldehyde disproportionation agent of the present invention in the same molar concentration.

It is surprising that high concentrations of chlorine dioxide can be produced in a gel matrix at a relatively high pH consistent with the topical delivery of chlorine dioxide. In addition, the gel compositions according to the present invention, because of the highly efficient production of chlorine dioxide at the desired pH, produce high concentrations of chlorine dioxide which are advantageous for treating numerous topical conditions, yet leave a reduced amount of chlorite residue compared to prior art methods. The reduced amount of chlorite residue is advantageous in topical applications according to the present invention because the reduced residue will significantly reduce the likelihood that an animal or person being exposed to the topical formulation will develop an allergic reaction or skin irritation to the chlorite. The use of biologically compatible low pKa acids is clearly preferred in the present invention because of the tendency of these compositions to limit the irritancy of the formulations on the skin. In addition, the low pKa acids tend to have little buffering capability compared with organic acids, and consequently, their use will allow the skin to easily adjust to a suitable pH, thereby producing less irritation of the skin.

The preferred gel formulations according to the present invention are advantageous compared to certain prior art formulations. By utilizing the biologically compatible low pKa acids according to the present invention as described above, the present gel formulations minimize the exposure of the skin to acid in its free acid form. For example, inorganic acids, due to the strength of their conjugate bases relative to that of chlorite ion tend to give up the proton (H+) in favor of chlorous acid production (equilibrium favors chlorous acid production, not the formation of acid). In producing chlorine dioxide in gel formulations according to the present invention, the low pKa acids will primarily exist in their counter ion form, not their free acid form. While not being limited by way of theory, it is believed that the counter ion form of the acid, compared to the free acid form, is a less irritating moiety and creates a formulation which is less reactive and irritating to the skin. On the other hand, gel formulations which rely on the inclusion of organic acids with higher pKa's to generate chlorine dioxide at a pH ranging from about 3.0 to about 4.5 will need to have more organic acid added to establish the initial pH and will also have more acid in the free acid form during the period the gel is exposed to the skin. The result of these less preferred formulations, is to produce a gel which is more irritating than the gels of the present invention.

In the gel formulations according to the present invention, compared to prior art methods which may include the use of an aldose or diol as a disproportionation agent, the present invention produces chlorine dioxide at a much faster rate and in a more efficient manner. For example, the gel formulations according to the present invention produce a concentration of chlorine dioxide within about ten minutes of at least about two times, preferably at least about four times and in many cases, as much as ten or more times the chlorine dioxide generated from the virtually identical compositions where an aldose has been substituted for the hydroxyl-free aldehyde disproprotionation agent. This is an unexpected result.

The gel formulations according to the present invention include, in addition to acid, chlorite salt, hydroxyl-free aldehyde and water, an amount of a gelling agent effective to gel the formulation for topical delivery on the skin of an animal or human. The amount of gelling agent ranges from about 0.5% to about 6.0% by weight with a preferred range of about 1% to about 4% by weight. Unlike in an aqueous system, a gel formulation utilizes thickening agents which, when dispersed in aqueous system, produce a viscous formal. This viscous format may slightly impair the formation and mobility of chlorine dioxide as this format impairs the ability of the individual reactants to produce chlorine dioxide and the formed chlorine dioxide to come in contact with the target area of the skin. Thus, the inclusion of the particular components which are used in the gel formulations according to the present invention are adapted to produce high concentrations of chlorine dioxide.

In addition to effective amounts of acid, chlorite salt, hydroxyl-free aldehyde disproportionation agent, water and gelling agent the gel formula%ions according to the present invention advantageously employ numerous additives which are commonly used in cosmetic and pharmaceutical formulations. These additives include, for example, surfactants such as sodium lauryl sulfate and poloxamer™ (polyoxypropylene/polyoxyethylene block copolymer), among numerous others, emulsifiers, emollients, such as lanolin and glycerol monostearate, among others, appropriate wound healing agents, lubricants and film-formers such as dimethicone, vaseline and mineral oil, among others, and diluents and fillers such as ethyl alcohol and isopropyl alcohol and humectants such as glycerin and propylene glycol. These additives are generally included in amounts ranging from about 0.025% to about 8% by weight or more. Fragrances are also advantageously employed in amounts ranging from about 0.01% to about 1% by weight or more. Skin penetrants, such as D-limonene, among numerous others, may also be employed to quickly dissolve the active ingredients and enhance the effect of topically administered chlorine dioxide by enhancing their skin penetration.

In general, the amount of hydroxyl-free disproportionation agent used in the present invention is an effective amount which varies depending upon the amount of chlorite ion and acid used and the desired concentration of chlorine dioxide to be generated. In general, the amount of disproportionation agent used in the present invention ranges from about 10 parts per million to about 20,000 parts per million or more (about 0.001% to about 2.0% by weight of the chlorine dioxide generating solution). In general, on a mole to mole basis, the amount of disproportionation agent utilized varies from about $\frac{1}{10}$ to about $\frac{1}{2}$ the amount of chlorite used, and preferably about $\frac{1}{3}$ to about $\frac{1}{2}$. While it is possible to utilize a disproportionation agent in concentrations above and below this amount, it is noted that at concentrations of disproportionation agent substantially below $\frac{1}{10}$ the molar concentration of chlorite, the rate at which disproportionation of chlorous acid to chlorine dioxide occurs may be diminished. At molar concentrations of disproportionation agent significantly above about $\frac{1}{2}$ the concentration of chlorite, residual amounts of disproportionation agent may remain in solution which could result in instability in the resulting chlorine dioxide solution. The effective amount of disproportionation agent is chosen to maximize chlorine dioxide formation and minimize the amount of residual chlorite in the chlorine dioxide mixture at a particular concentration of the initial salt of chlorite and at the desired initial pH.

Figure 2A:
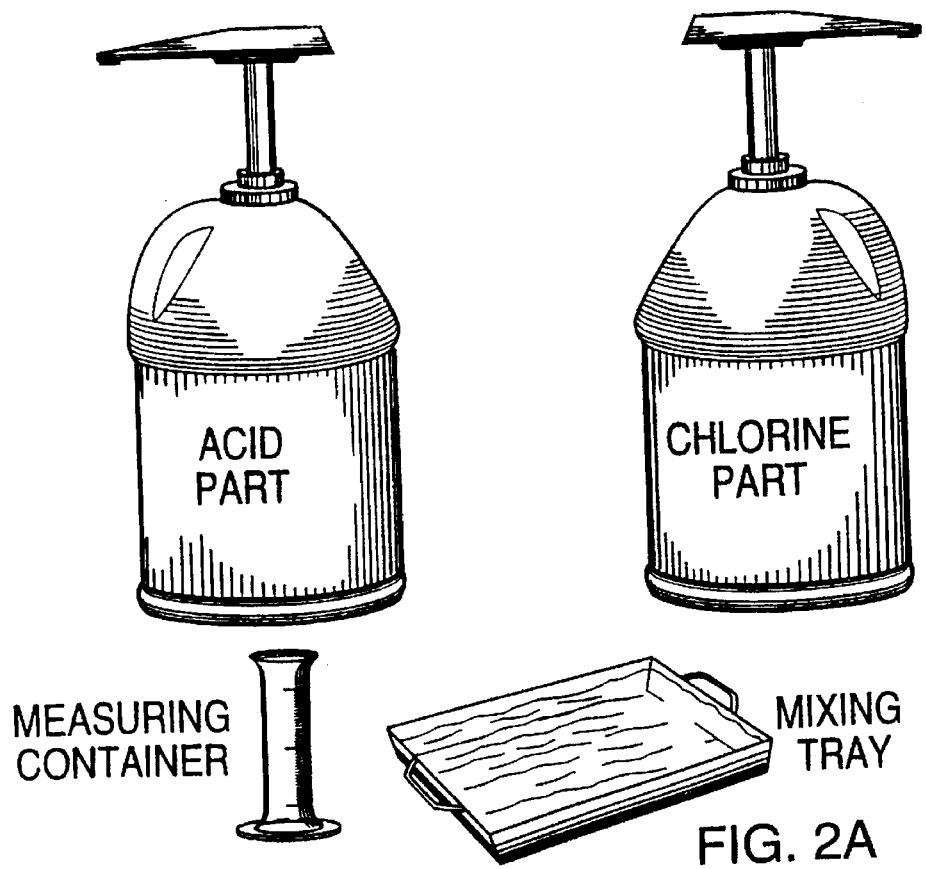
FIG. 2 is a diagrammatic representation of a two-part system comprising two containers, one for chlorite salt and the other for the acid.
Figure 2B:
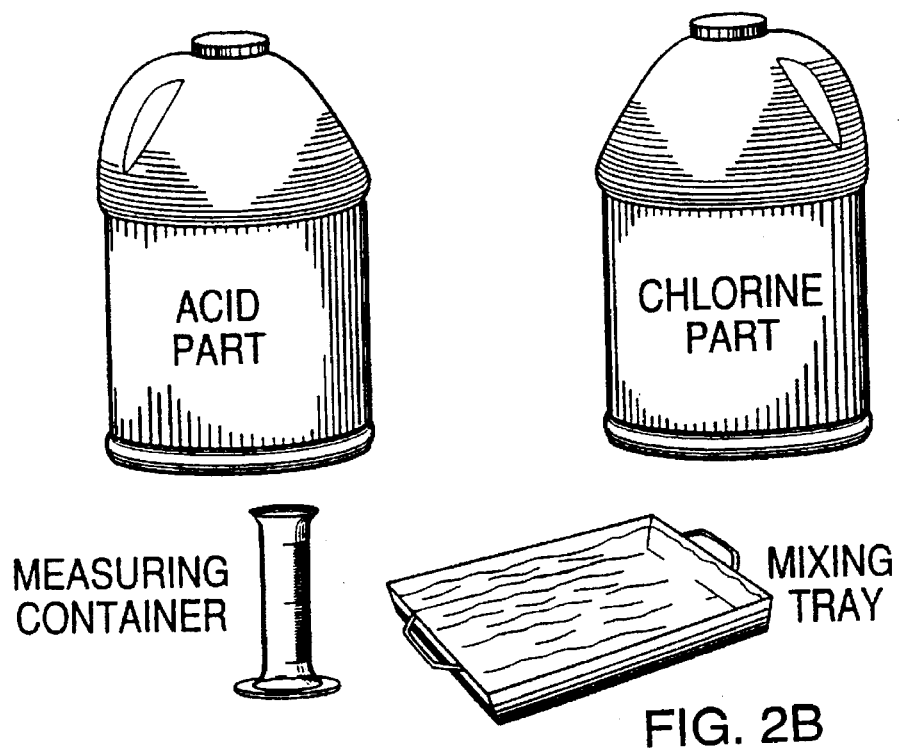

In the general method according to the present invention, the apparatus as set forth in FIGS. 1 and 2A and 2B are representative of systems which may be used to generate chlorine dioxide. As set forth in FIG. 1, a chosen amount of chlorite salt is dissolved in water in vat A. Preferably, the chlorite salt is the sodium or potassium salt. The concentration of chlorite salt chosen is an effective amount which generally ranges from about 0.001 to about 0.5Molar (generally, for example, about 0.09 g. to about 45 g./liter of sodium chlorite, but amounts above and below these concentrations may also be used in certain embodiments). The chlorite salt is first added to water and dissolved. Depending upon the type and final concentration of chlorite chosen, the pH of the solution in Vat A may range from about 9.0 to significantly above about 10. A pH above 10, for example about 10.5, is often employed.

A second solution, contained in Vat B, is prepared containing an effective amount of an acid, preferably a biologically compatible acid, for example, sodium bisulfate. In embodiments according to the present invention in which corrosion is not a concern, the pH of the solution without a disproportionation agent is preferably maintained below about 2.5. The amount of acid chosen is that amount which is effective to produce a substantial quantity of chlorous acid. This amount of acid will generally provide an initial pH of the reaction mixture (which includes the chlorite salt) in which chlorine dioxide is produced below about pH 2.5. Optionally, into this acid solution, an effective amount of a hydroxyl free aldehyde disproportionation agent may be added to enhance disproportionation of chlorous acid to chlorine dioxide. Generally, the inclusion of the hydroxyl-free aldehyde will not appreciably affect the pH of the resulting solution. The final pH of the acid solution which includes the disproportionation agent in this aspect of the invention is generally less than about 5 and is preferably less than about 2.5, more preferably less than about 2.0 and most preferably less than about 1.8. The pH of this solution is chosen to produce an initial pH in the reaction mixture of less than about 5.0. In this aspect of the present invention which includes a hydroxyl-free aldehyde disproportionation agent, any acid may be used including any of the aforementioned acids, among others, but preferably a low pKa biologically compatible acid such as salts of bisulfate, maleic acid, sulfamic acid, phosphoric acid and ethylenediaminetetraacetic acid (EDTA, as the free acid or the monosodium salt) is used.

Vats A and B are each stoppered so that the contents of each vat may be metered into reaction chamber C. Each or both of the Vats may be graduated. The stoppering of vats A and B (valves (1) and (2)) will allow a measured or premeasured amount of the contents of each Vat to be delivered in a controllable manner to the reaction chamber C while valve (3) is open and is closed. In the reaction chamber, the chlorite is acidified with the low pKa biologically compatible acid to produce chlorous acid and subsequently, the generated chlorous acid is disproportionated in situ into chlorine dioxide. The concentration of chlorine dioxide increases within the reaction chamber until such time as the reaction is completed. In general, the reaction(s) to produce chlorine dioxide without the aid of the disproportionation agent is slow and may require about 30 minutes or higher to be completed (level off).

With an effective amount of a hydroxyl free aldehyde disproportionation agent, the concentration of chlorine dioxide generated within a period of about 10 minutes ranges from at least about 1 ppm and preferably at 3. east about 5 ppm to upwards of 100 ppm or more. More preferably, the compositions according to the present invention produce concentrations of chlorine dioxide in an amount of at least about 25 ppm within a period of no greater than about 10 minutes. The amount of chlorine dioxide produced in a period of about 10 minutes using the combination of an acid, an aqueous soluble salt of chlorite and a hydroxyl-free aldehyde according to the instant invention is generally at least about two times, preferably at least about 4 times and as much as about ten times or more the production of chlorine dioxide using the same type and concentration of acid and salt of chlorite, but substituting an aldose for the hydroxyl-free aldehydes of the instant invention. This is a particularly surprising result when the prior art and in particular, Davidson, et al., in U.S. Pat. No. 4,986,990, teach the inclusion of a vicinal hydroxyl containing disproportionation agent at an acidic pH, i.e., below a pH of about 5.

In the gel formulations according to the present invention which utilize, the amount of chlorine dioxide generated is generally at least about 5 parts per million, more preferably at least about 25 parts per million and most preferably at least about 50 ppm within a period of about ten minutes. The amount and rate of chlorine dioxide produced in the gel formulations according to the present invention is generally at least about two times, preferably at least about 4 times and as much as ten times or more the production of chlorine dioxide compared to a gel composition which uses the same type and concentration of acid and salt of chlorite, but where an aldose is substituted for the hydroxyl-free aldehyde disproportionation agent.

The unexpectedly high concentrations of chlorine dioxide which are generated within a short period of time (about 15 minutes or less) by the compositions according to the present invention are particularly useful in topical applications for treating a wide variety of conditions of the skin including herpes, ache, dandruff, poison ivy, diabetic ulcers, bed sores, warts and nail fungus. In addition, compositions according to the present invention may be used to treat sunburn and superficial wounds of the skin. In general, when treating these abnormal conditions of the skin, a concentration of chlorine dioxide ranging from about 10 ppm to about 100 ppm or more is applied to the skin condition at least once a day and up to four or more times a day. In preferred embodiments according to the present invention, a gel composition which produces a concentration of at least about 25 ppm up to about 100 ppm is administered or applied to the topical condition to be treated. In many instances, at least some instantaneous relief from the symptoms of the topical condition is seen within the first half hour upon application of the gel to the skin to be treated. For further treatment and the elimination of the skin condition, longer periods of treatment are advised, e.g., from one day up to several weeks or longer. For therapeutic treatment, the application of the gel composition according to the present invention to the condition to be treated at least once a day and up to eight or more times per day is generally advised. One of ordinary skill in the art will be able to readily adjust the concentration of chlorine dioxide administered as well as the duration and frequency of application in crier to treat the patient in the most efficacious manner.

A particularly useful application of the gel compositions according to the present invention includes the treatment of the inflammatory affects of bug bites. It has unexpectedly been discovered that the topical application of concentrations of chlorine dioxide of at least about 10 ppm and more preferably at least about 25 ppm on skin which is inflamed or otherwise affected by bug bites (urticaria, rash, hives, etc.) will alleviate the symptomotology and reduce the inflammation of the skin affected by the insect bite. This is an unexpected result. In this treatment method, compositions which produce concentrations of at least about 10 ppm chlorine dioxide and preferably at least about 25 ppm chlorine dioxide within a period no greater than about 15 minutes are particularly useful in treating skin affected by bug bites.

The production of chlorine dioxide may be monitored photometrically at 360 nm using an extinction coefficient of 1250 $M^{-1}cm^{-1}$ as described on pp.244–245 of "Chemistry of Chlorine Dioxide", In *Progress in Inorganic Chemistry*, Vol. 15, S. J. Lippard (Editor), Wiley-Interscience, New York (1972). In certain aspects according to the present invention, the final concentration of chlorine dioxide is preferably greater than about 20 ppm, and more preferably the final concentration of chlorine dioxide in the reaction chamber ranges from about 80–100 parts per million (ppm) to upwards of 400 ppm or more. The concentration of chlorine dioxide which is produced using higher pKa acids, especially organic acids at higher pH values, will generally fall within the same range set forth above. Generally, on a mole to mole basis, the amount of chlorine dioxide produced using an organic acid will be lower than the chlorine dioxide concentration produced from a low pKa acid.

After the completion of the formation of chlorine dioxide in reaction chamber C, the contents of reaction chamber C are deposited into dilution tank D by opening valve 4 (valve 5 is closed). Here, the chlorine dioxide solution from reaction chamber C is mixed with water or other aqueous solution in dilution tank D (generally about a 20–40 fold dilution, preferably about 30 fold) so as to create a chlorine dioxide solution with a final concentration generally ranging from slightly less than about 1 ppm to about 10 ppm, with a preferred concentration of about 1 ppm to about 5 ppm. The pH of the final diluted solution of chlorine dioxide for use as a disinfectant preferably ranges from about 4.5 to about 7 with a more preferred range from about 5.5 to about 6.5.

In FIGS. 2A and 2B, which figures are representative of the non-corrosive aspect of the instant invention, the chlorite part ranges from about 50 ppm to about 50,000 ppm. The pH of the chlorite part may generally range from about 9.0 to about 10.8 although an initial pH outside of this range may also be used. The acid part contains an effective amount of an acid, preferably a low pKa acid which is more preferably non-toxic and the pH of the acid part ranges from about 3.5 to about 4.5. Into the acid part, optionally, may be added an amount of an aldehyde disproportionation agent effective to enhance disproportionation of chlorous acid to chlorine dioxide. The amount of aldehyde disproportionation agent ranges from about 20 ppm to about 40,000 ppm. In this aspect of the present invention in which the aldehyde disproportionation agent is utilized, any acid may be used including any of the aforementioned acids, among others, but preferably a non-toxic low pKa acid is used. When the chlorite part is added to the acid part (which preferably contains the hydroxyl free aldehyde), the combined mixture has a pH of less than about 5.0.

The final solutions of chlorine dioxide in diluted form may be used for purposes of disinfecting surfaces, especially surfaces which may require reduced amounts of chlorite ion, for example, food equipment, and medical devices and dental equipment. In addition, the solutions according to the present invention may also be used for any other known purpose especially including drinking water. The number of applications of the chlorine dioxide solutions according to the present invention is believed to be larger than for solutions which are produced according to prior art methods because the solutions of the instant invention are compatible with food, medical and dental equipment as well as other uses known in the art.

EXAMPLES

The following examples are provided to illustrate the present invention and should not be construed to limit the scope of the invention of the present application in any way.

Example 1

To Vat A (See FIG. 1) was added an aqueous solution containing about 0.7 g./liter of pure sodium chlorite (T.R.-AMC Chemicals, a Division of TR-Metro Chemicals, Inc., Ridgefield, N.J.). To Vat B was added about 0.4 g./liter of potassium bisulfate, which produced a pH of about 1.9. To this solution about 0.2 g/liter of acetaldehyde was added.

The contents of Vat A and Vat B were emptied into the reaction chamber C by opening valves 1, 2 and 3 (valve 4 is closed). The pH of the mixture in the reaction chamber is approximately 2.2. The reaction mixture was allowed to stand for a period of ten minutes after which time approximately 92% of the initial chlorite salt had been converted to chlorine dioxide (40%) and chloride ion (60%). The concentration of chlorine dioxide in the aqueous solution in the reaction chamber was about 110 ppm as measured spectrophotometrically at 360 nm using an extinction coefficient of $1250M^{-1}cm^{-1}$. The concentration of chlorite ion which remains was approximately 30 ppm. The concentrated chlorine dioxide solution is thereafter delivered to the dilution tank D and diluted 30 fold to a final concentration of 3.5 ppm chlorine dioxide and a pH of about 6. In the final diluted disinfectant solution, the concentration of chlorite ion is about 1 or less ppm. The relatively high pH of the solution is caused by the 30-fold dilution the production of water using up hydronium ($H_3O^{3O}$) ions during the reaction and the effect of chlorine dioxide as a Lewis Acid is minimized at high dilution.

Example 2

Same method employed as in example 1, except that into Vat B was added 0.4 g/liner of potassium bisulfate in combination with 0.18 g/liter of propionaldehyde. The resulting solution produced a concentration of chlorine dioxide of about 110 ppm in the reaction chamber C as measured spectrophotometrically at 360 nm using an extinction coefficent of $1250M^{-1}cm^{-1}$. A 30 fold dilution of the final concentration of chlorine dioxide produced a final concentration in the dilution chamber D of about 3.5 ppm chlorine dioxide and a final concentration of chlorite ion of about 1 or less ppm.

Example 3

Same method employed as in example 1, except that into Vat B was added 0.4 g/liner of potassium bisulfate in combination with about 0.29 g/liter of benzaldehyde. The resulting solution produced a concentration of chlorine dioxide of about 30–40 ppm in the reaction chamber C as measured spectrophotometrically at 360 nm using an extinction coefficent of $1250M^{-1}cm^{-1}$. A 30 fold dilution of the final concentration of chlorine dioxide produced a final concentration in the dilution chamber D of about 1.0 ppm chlorine dioxide and a final concentration of chlorite ion which is significantly less than if disproportionation had not been included.

Example 4

In an embodiment related to the non-corrosive aspect according to the present invention, as in Example 1, the following two-part formulation when combined in about a 1:1 ratio provides a composition useful for the disinfection of hard substrates such as dental and/or medical devices.

| Liquid Disinfectant | |
|---|---|
| | Percent by Weight |
| Chlorite Part | |
| Sodium chlorite (80%) | 0.250% |
| EDTA, tetra sodium (98%) | 0.095% |
| Sodium lauryl sulfate | 0.004% |
| Deionized Water | q.s. |
| Acid Part | |
| Potassium bisulfate (anhydrous) | 0.400% |
| Sodium propionate | 0.150% |
| Glutaraldehyde (50%) | 0.080% |
| Cinnamic aldehyde | 0.015% |
| Deionized Water | q.s. |

As noted, the disproportionation agent in the form of a hydroxyl free aldehyde chemical compound, namely glutaraldehyde, is preferably added to the acid part. In this example, cinnamic aldehyde is used as a fragrance. The resulting composition after 15 minutes has a pH of about 4.2 and produces a concentration of chlorine dioxide of about 45 ppm as measured spectrophotometrically at 360 nm (molar absorptivity of 1250 per mole/centimeter). Within this period, about 40% of the initial chlorite is consumed. This composition is readily applicable for disinfection of hard surfaces such as dental and/or medical devices.

Example 5

In a preferred composition related to the non-corrosive aspect of the present invention, which results from about a 1:1 ratio of a combination of the following two part formulation, a liquid disinfectant is obtained which is useful for applications on dental and/or medical devices.

| Liquid Disinfectant | |
|---|---|
| | Percent by Weight |
| Chlorite Part | |
| Sodium chlorite (80%) | 0.250% |
| EDTA, tetra sodium (98%) | 0.095% |
| Sodium lauryl sulfate | 0.004% |
| Deionized Water | q.s. |
| Acid Part | |
| Potassium bisulfate (anhydrous) | 0.360% |
| Sodium propionate | 0.150% |
| Propionaldehyde | 0.010% |
| Deionized Water | q.s. |

As noted, the disproportionation agent in the form of a hydroxyl free aldehyde chemical compound, namely propionaldehyde, is preferably added to the acid part. The resulting composition has a pH of about 3.9 and produces a concentration of chlorine dioxide of about 38 ppm as measured spectrophotometrically at 360 nm (molar absorptivity of 1250 per mole/centimeter during a period of about 10 minutes. Within this period, about 15% of the initial chlorite is consumed. This composition is readily applicable for disinfection of hard surfaces such as dental and/or medical devices.

Example 6

In yet another embodiment related to the non-corrosive aspect according to the present invention, the following two-part formulation, when combined in about a 1:1 ratio, provides a composition useful for the disinfection of hard substrates such as dental and/or medical devices. The pH of the composition is about 4.2 and produces about 27 ppm of chlorine dioxide during an aging period of about 15 minutes.

| Liquid Disinfectant | |
|---|---|
| | Percent by Weight |
| Chlorite Part | |
| Sodium chlorite (80%) | 0.190% |
| EDTA, tetra sodium (98%) | 0.092% |
| Sodium lauryl sulfate | 0.004% |
| Deionized Water | q.s. |
| Acid Part | |
| Potassium bisulfate (anhydrous) | 0.300% |
| Sodium propionate | 0.150% |
| Propionaldehyde | 0.030% |
| Deionized Water | q.s. |

Example 7

Comparison of the Present Invention At a pH Less Than About 5.0 With Prior Art Methods The present invention which utilizes an acid and a salt of chlorite in combination with a hydroxyl free aldehyde chemical compound at a pH no greater than about 5.0 to generate chlorine dioxide was compared with the prior methods of Hampel, as set forth in U.S. Pat. No. 2,323,594 ("the Hampel method") and Davidson, as set forth in U.S. Pat. No. 4,986,990 ("the Davidson method"). Control experiments, which excluded a disproportionation agent, were also performed in which chlorine dioxide was generated by mixing sodium chlorite with an acid at a pH of about 2.65 and about 5. The control experiments were performed in order to generally assess the value of the disproportionation agent in the present invention, the Hampel method and the Davidson method. The results of this comparison evidence the production of unexpectedly greater quantities of chlorine dioxide using the method of the present invention compared to the prior art methods.

General Method

Chlorine dioxide was generated in the following experiments, all of which were performed at room temperature under essentially identical conditions (initial sodium chlorite and disproportionation agent concentration). In certain experiments, the initial pH was constant; in other cases the pH was changed from one experiment to another, primarily to determine the effect that pH had on the formation of chlorine dioxide and/or residual chlorite levels. Chlorine dioxide levels were determined in each case by standard spectrophotometric methods, using a wavelength of 360nm. Sodium chlorite levels were determined by iodometric titrations using 0.1N thiosulfate reagent. The starting pH for the various experiments was about 2.65 or 5.0 for the present method, the Davidson method and the control experiment, and 7.2 for the Hampel experiment.

I. Experiments at pH 2.65

The studies performed at pH 2.65 (the present invention, the Davidson method or the control experiment) utilized a first solution (part B) containing 0.140% by weight potassium bisulfate (anhydrous) in water, and in the case of the present invention and the Davidson method, a 0.0091 molar concentration of a disproportionation agent in addition to the acid. In the present invention acetaldehyde was the disproportionation agent and in the Davidson method mannose, glucose, glycerin or inositol (as taught by Davidson) was the disproportionation agent. To initiate chlorine dioxide formation, an aqueous solution containing 0.102% by weight sodium chlorite (part A) was added to the acidic solution (part B) in equal volumes and mixed.

The above experiments were also compared with the Hampel method. Using the Hampel method, chlorine dioxide was generated at a pH of 7.2 utilizing 0.040% of acetaldehyde (0.0091 molar) in buffer solution. The buffer solution was prepared by dissolving 34.5 grams of sodium phosphate monobasic (NaH2PO4.H2O) in 500 ml of deiozined water, adjusting the pH to 7.2 using a solution of sodium hydroxide and then diluting to 1 liter with deionized water. Chlorine dioxide formation and the pH of the solution at room temperature in each of these experiments were measured at 2 minutes, 5 minutes and 10 minutes after initial mixing.

The results of these low pH experiments, along with the results obtained using the Hampel method, are presented and compared in Tables 1 and 2. Table 1 evidences a tremendous difference in the amount and rate of formation of chlorine dioxide using the present invention at pH 2.65 compared with the methods of Hampel, Davidson or the control experiment. It is noteworthy that the aldose and diol disproportionation agents of Davidson were only marginally better than the control experiment in generating chlorine dioxide at pH 2.65. For the Hampel method, the generation of chlorine dioxide was considerably less than the control.

Table 2 sets forth the concentration of chlorite remaining in solution 5 minutes after initial mixing to form chlorine dioxide in the different methods. The results evidence that the amount of chlorite remaining in solution after 5 minutes using the present invention is about 28 to about 35 fold less than it is for the control experiment or the experiments using the method of Hampel or Davidson.

TABLE 1

| PPM Level of Chlorine Dioxide Generated | | | | | | | |
|---|---|---|---|---|---|---|---|
| Time | | Present | | Davidson | | | |
| pH | Control | Invention | Mann. | Gluc. | Glyc. | Inos. | Hampel |
| 2 Min. | 2.0 | 150 | 3.8 | 3.0 | 2.0 | 2.0 | 0.2 |
| pH | 2.65 | 2.70 | 2.65 | 2.60 | 2.60 | 2.60 | 7.2 |
| 5 Min. | 4.0 | 160 | 8.60 | 5.80 | 3.90 | 4.0 | 0.6 |
| pH | 2.65 | 2.75 | 2.60 | 2.65 | 2.65 | 2.60 | 7.2 |
| 10 Min. | 6.0 | 160 | 12.6 | 8.0 | 6.0 | 5.5 | 1.0 |
| pH | 2.60 | 2.70 | 2.65 | 2.60 | 2.60 | 2.60 | 7.2 |

TABLE 2

| Percent Residual Levels of Sodium Chlorite ($NaClO_2$) After 5 Minute Aging Period | | |
|---|---|---|
| Experiment | pH | % $NaClO_2$ Remaining |
| Control | 2.65 | 96.8% |
| Present Invention | 2.65 | 2.75% |
| Davidson | | |
| Mannose | 2.65 | 96% |
| Glucose | 2.65 | 96% |
| Glycerin | 2.65 | |
| Inositol | 2.65 | 96.8% |
| Hampel | 7.2 | 76.6% |

II. Experiments at pH 5.0

The studies performed at pH 5.00 (the present invention, the Davidson method or the control experiment) utilized a first solution (part B) containing 0.050% by weight potassium bisulfate (anhydrous) in water, and in the case of the present invention and the Davidson method, a 0.0091 molar concentration of a disproportionation agent in addition to the acid. In the present invention acetaldehyde was the disproportionation agent and in the Davidson method mannose, glucose, glycerin or inositol (as taught by Davidson) was the disproportionation agent. To initiate chlorine dioxide formation, an aqueous solution containing 0.102% by weight sodium chlorite (part A) was added to the acidic solution (part B) in equal volumes and mixed.

The above experiments were also compared with the Hampel method as taught above. As above, chlorine dioxide formation and the pH of the solution at room temperature in each of these experiments were measured at 2 minutes, 5 minutes and 10 minutes after initial mixing.

The results of these low pH experiments, along with the results obtained using the Hampel method, are presented and compared in Tables 3 and 4. Table 3 evidences a huge difference in the amount (at least 37 fold more) and rate of formation of chlorine dioxide using the present invention at pH 5.0 compared with the methods of Hampel, Davidson or the control experiment. It is noted that the aldose and diol disproportionation agents of Davidson were slightly better than the control experiment in generating chlorine dioxide at pH 5.0, but significantly less efficient than the hydroxyl free aldehyde used in the present invention. For the Hampel method, the generation of chlorine dioxide was slightly better than the control or Davidson.

Table 4 sets forth the concentration of chlorite remaining in solution 5 minutes after initial mixing to form chlorine dioxide in the different methods. The results evidence that the amount of chlorite remaining in solution after 5 minutes using the present invention is significantly less than it is for the control experiment or the experiments using the method of Davidson. The amount of chlorite remaining after employing the method of Hampel is similar to the present invention, although significantly more chlorite did remain in the case of Hampel compared with the present invention.

TABLE 3

PPM Level of Chlorine Dioxide Generated

| Time | Present | | Davidson | | | | |
|---|---|---|---|---|---|---|---|
| pH | Control | Invention | Mann. | Gluc. | Glyc. | Inos. | Hampel |
| 2 Min. | N.D. | 15.0 | ≦0.1 | ≦0.1 | ≦0.1 | ≦0.1 | 0.2 |
| pH | 5.0 | 5.0 | 5.0 | 5.0 | 5.0 | 5.0 | 7.2 |
| 5 Min. | N.D. | 22.0 | ≦0.2 | ≦0.1 | ≦0.1 | ≦0.1 | 0.6 |
| pH | 5.0 | 5.3 | 5.0 | 5.0 | 5.0 | 5.0 | 7.2 |
| 10 Min. | N.D. | 37.0 | ≦0.2 | ≦0.1 | ≦0.1 | ≦0.1 | 1.0 |
| pH | 5.0 | 5.2 | 5.0 | 5.0 | 5.0 | 5.0 | 7.2 |

PPM = Parts Per Million
Min. = Minutes
N.D. = Not Detectable
Mann. = Mannose (Aldose)
Gluc. = Glucose (Aldose)
Glyc. = Glycerin
Inos. = Inositol (Cyclic Alcohol)

TABLE 4

Percent Residual Levels of Sodium Chlorite ($NaClO_2$) After 5 Minute Aging Period

| Experiment | pH | % $NaClO_2$ Remaining |
|---|---|---|
| Control | 5.00 | about 100% |
| Present Invention | 5.20 | 70.6% |
| Davidson | | |
| Mannose | 5.00 | about 100% |
| Glucose | 5.00 | about 100% |
| Glycerin | 5.00 | about 100% |
| Inositol | 5.00 | about 100% |
| Hampel | 7.2 | 76.6% |

Example 8

Use of Organic Acid As Substitute for Low pKa Acids

In the above-described experiments, organic acids such as acetic acid, tartaric acid, citric acid, lactic and similar organic acids are substituted for sodium bisulfate. The method is performed at pH 2.70 and 5.0. The results indicate that at pH 2.70 the generation of chlorine dioxide (about 70 PPM) using the present invention is significantly greater and the residual chlorite remaining (about 54%) is significantly less than using the methods of Davidson at a pH of 2.70 or Hampel (7.20). At pH 5.0, the results of the present invention (about 20 PPM chlorine dioxide generated and about 72% residual chlorite remaining) are comparatively better than either the method of Davidson performed at pH 5.0 or the Hampel method. However, the difference between the results generated by the present invention using an organic acid at a pH of 5.0 and the methods of Davidson at a pH of about 5.0 and Hampel at pH 7.2 are not as great as in the case where the present method is performed at the lower pH of 2.70. Moreover, the use of a low pKa acid such as sodium bisulfate also produces significantly better results than using an organic acid (higher pKa) at the same pH.

Example 9

Comparison of the Present Invention at a pH ranging from 3.5 to about 4.5 With Prior Art Methods The present invention which relates to a non-corrosive formulations, employing a vicinal hydroxyl free aldehyde in combination with a salt of chlorite and an acid at an initial pH of about 3.5 to about 4.5, was compared with the method described in U.S. Pat. No. 4,986,990 ("Davidson") and the method described in U.S. Pat. No. 2,323,594 ("Hampel") as generally described above in Example 7. In addition to the Davidson and Hampel methods, control experiments, which excluded a disproportionation agent, were also performed in which chlorine dioxide was generated by mixing sodium chlorite with an acid at a pH of about 3.5 and about 4.5.

Chlorine dioxide was generated using the present invention and the above-referenced prior art methods in the following experiments, all of which were performed at room temperature under essentially identical conditions (initial sodium chlorite and except for the control experiment, disproportionation agent concentration). In all cases the initial pH was constant (at about 3.5 or 4.5 or, in the case of the Hampel method, about 7.2). Chlorine dioxide levels were determined for each experiment by standard spectrophotometric methods, using a wavelength of 360nm. Sodium chlorite levels were determined by iodometric titrations using 0.1N thiosulfate reagent. The starting pH for the various experiments was about 3.5 or 4.5 for the present method, the Davidson method and the control experiment, and 7.2 for the Hampel experiment (as taught by Hampel).

The experiments performed at an initial pH of about 3.5 and 4.5 (the present invention, the Davidson method or the control experiment) utilized a first solution (part B) containing about 0.050% by weight potassium bisulfate (anhydrous) in water, and in the case of the present invention and the Davidson method, a 0.0091 molar concentration of a disproportionation agent in addition to the acid (as in Example 7). In the present invention, acetaldehyde was the disproportionation agent and in the Davidson method mannose, glucose, glycerin or inositol (as taught by Davidson) was the disproportionation agent. To initiate chlorine dioxide formation, an aqueous solution containing about 0.10% by weight sodium chlorine (part A) was added to the acidic solution (part B) in equal volumes and mixed.

The above experiments were also compared with the Hampel method. As in Example 7 which duplicated the Hampel method, chlorine dioxide was generated at a pH of 7.2 utilizing 0.040% of acetaldehyde (0.0091 molar) in buffer solution. The buffer solution was prepared by dissolving 34.5 grams of sodium phosphate monobasic (NaH2PO4.H2O) in 500 ml of deionized water, adjusting the pH to 7.2 using a solution of sodium hydroxide and then diluting to 1 liter with deionized water. Chlorine dioxide formation and the pH of the solution at room temperature in each of these experiments were measured at 2 minutes, 5 minutes and 10 minutes after initial mixing.

The results of the above-described experiments for the control, the method of Davidson and the instant invention are presented and compared in Tables 5–8, below. The results of the Hampel experiment were previously presented in Tables 1–4 in Example 7, above and are re-presented in Tables 5–8 hereinbelow for purposes of comparison. Tables 5 and 7 evidence a large difference in the amount and rate of formation of chlorine dioxide using the present invention at an initial pH of about 3.5 and 4.5 compared with the methods of Davidson, the control experiment or the Hampel Method. It is noted that the aldose and diol disproportionation agents of Davidson were better than the control experiment in generating chlorine dioxide at pH 3.5 and 4.5, but significantly less efficient than the hydroxyl free aldehyde used in the present invention. For the Hampel method, the generation of chlorine dioxide ranged from slightly worse to slightly better than for the control or Davidson experiment.

Tables 6 and 8 set forth the concentration of chlorite remaining in solution 10 minutes after initial mixing to form chlorine dioxide in the different methods. The results evidence that the amount of chlorite remaining in solution after 10 minutes using the present invention is significantly less than it is for the control experiment or the experiments using the method of Davidson.

TABLE 5

PPM Level of Chlorine Dioxide Generated at pH 3.5

| Time pH | Control | Present Invention | Davidson Mann. | Gluc. | Glyc. | Inos. | Hampel |
|---|---|---|---|---|---|---|---|
| 2 Min. | 0.3 PPM | 79.0 PPM | 1.5 | 0.9 | 0.4 | 0.3 | 0.2 |
| pH | 3.5 | 3.6 | 3.5 | 3.5 | 3.5 | 3.5 | 7.2 |
| 5 Min. | 0.4 PPM | 96.0 PPM | 2.2 | 1.4 | 0.4 | 0.3 | 0.6 |
| pH | 3.5 | 3.6 | 3.4 | 3.5 | 3.5 | 3.5 | 7.2 |
| 10 Min. | 0.5 PPM | 110 PPM | 4.0 | 2.4 | 0.5 | 0.3 | 1.0 |
| pH | 3.5 | 3.7 | 3.4 | 3.5 | 3.4 | 3.5 | 7.2 |

PPM = Parts Per Million
Min. = Minutes
N.D. = Not Detectable
Mann. = Mannose (Aldose)
Gluc. = Glucose (Aldose)
Glyc. = Glycerin
Inos. = Inositol (Cyclic Alcohol)

TABLE 6

Percent Residual Levels of Sodium Chlorite (NaClO$_2$)
After 10 Minute Aging Period at pH 3.5

| Experiment | pH | % NaClO$_2$ Remaining |
|---|---|---|
| Control | 3.5 | 99.4% |
| Present Invention | 3.6 | 32 |
| Davidson | | |
| Mannose | 3.4 | about 97.8% |
| Glucose | 3.5 | about 98% |
| Glycerin | 3.4 | about 99.2% |
| Inositol | 3.5 | about 99.2% |
| Hampel | 7.2 | 76.6% |

TABLE 7

PPM Level of Chlorine Dioxide Generated at pH 4.5

| Time pH | Control | Present Invention | Davidson Mann. | Gluc. | Glyc. | Inos. | Hampel |
|---|---|---|---|---|---|---|---|
| 2 Min. | 0.1 PPM | 17.0 PPM | 0.2 | 0.1 | 0.1 | 0.1 | 0.2 |
| pH | 4.5 | 4.6 | 4.4 | 4.4 | 4.4 | 4.4 | 7.2 |
| 5 Min. | 0.1 PPM | 24.0 PPM | 0.2 | 0.2 | 0.1 | 0.1 | 0.6 |
| pH | 4.5 | 4.7 | 4.4 | 4.4 | 4.4 | 4.4 | 7.2 |
| 10 Min. | 0.1 PPM | 38.0 PPM | 0.2 | 0.2 | 0.1 | 0.1 | 1.0 |
| pH | 4.5 | 4.7 | 4.3 | 4.4 | 4.4 | 4.5 | 7.2 |

PPM = Parts Per Million
Min. = Minutes
N.D. = Not Detectable
Mann. = Mannose (Aldose)
Gluc. = Glucose (Aldose)
Glyc. = Glycerin
Inos. = Inositol (Cyclic Alcohol)

TABLE 8

Percent Residual Levels of Sodium Chlorite (NaClO$_2$)
After 10 Minute Aging Period at pH 4.5

| Experiment | pH | % NaClO$_2$ Remaining |
|---|---|---|
| Control | 4.5 | 99.6% |
| Present Invention | 4.7 | 67 |
| Davidson | | |
| Mannose | 4.3 | about 98% |
| Glucose | 4.4 | about 98.4% |

TABLE 8-continued

Percent Residual Levels of Sodium Chlorite (NaClO$_2$)
After 10 Minute Aging Period at pH 4.5

| Experiment | pH | % NaClO$_2$ Remaining |
|---|---|---|
| Glycerin | 4.4 | about 99.6% |
| Inositol | 4.5 | about 99.6% |
| Hampel | 7.2 | 76.6% |

The results of the comparison experiments presented herein evidence the production of unexpectedly greater quantities of chlorine dioxide using the method of the present invention at a pH of about 3.5 to about 4.5 compared to the prior art methods. While a combination of the teachings of Hampel and Davidson suggest that the inclusion of a hydroxyl-free aldehyde disproportionation agent should result in less chlorine dioxide being formed compared with the same formulation which includes a vicinal hydroxyl-containing disproportionation agent, in fact the opposite is true. In addition, the present invention is significantly more efficient (i.e., utilizes chlorite more efficiently) than are the prior art methods. It is unexpected that the inclusion of a hydroxyl free aldehyde in the method of the present invention would produce a such dramatic differences in the efficiency of the production of chlorine dioxide when compared to the prior art methods described in Hampel and Davidson.

Example 10

Gel Formulation

| Ingredients | % w/w (Crude) |
|---|---|
| Chlorite Part (A) | |
| Natrosol 250H NF | 2.400 |
| Glycerin | 4.000 |
| Myvaplex | 1.000 |
| Dimethicone 193 | 1.000 |
| EDTA, Na$_4$ (87%) | 0.450 |
| Sodium laurylsulfate | 0.020 |
| Sodium chlorite (80%) | 2.000 |
| Propylene glycol | 0.100 |
| Ethyl alcohol anhydrous | 5.000 |
| Fragrance | 0.020 |
| Water | q.s. |
| Acid Part (B) | |
| Natrosol 250H NF | 2.400 |
| Potassium bisulfate anhydrous | 0.710 |
| Propionaldehyde | 0.070 |
| Glycerin | 8.000 |
| Pluronic F68 NF | 0.200 |
| Isopropyl alcohol anhydrous | 6.000 |
| Myvaplex | 1.000 |
| Dimethicone 193 | 1.000 |
| Fragrance | 0.020 |
| Water | q.s. | pH of the Chlorite Part=Falls Within the Range of About 10.0 to about 11.5
pH of Acid Part=Range of about 2.10 to about 2.25, preferably about 2.20.
pH of Chlorite Part (A)+Acid Part (B) at 1:1 mixing ratio= 4.0
The levels of chlorine dioxide generated after 2 minutes aging period is about 60 ppm. Due to opacity of the mixture, chlorine dioxide levels were measured by amperometric method using a platinum redox electrode at room temperature.

The ingredients which are included in the formulation produce the consistency of a hand lotion having disinfecting qualities.

Natrosol 250H is a NF grade of hydroxyethylcellulose and is the gelling agent used in this example Myvaplex is a brand name glyceryl monostearate and is used as a skin conditioner and softener.

Dimethicone 193 is a cosmetic grade of dimethylsiloxane silicon polymer and is included as a lubricant, film-former and as an emulsifier.

Glycerin and propylene glycol are widely used as humectants in cosmetic preparations.

Sodium laurylsulfate is used in cosmetics as a surface active agent (surfactant) and a cleaning agent.

Ethyl alcohol is used as a solvent for Myvaplex.

EDTA, Na$_4$ is included as an alkali.

Pluronic F68 NF is a polyoxypropylene (POP)-polyoxyethylene (POE) block copolymer and is included as a surfactant.

Isopropyl alcohol is included as a solvent and an emulsifier.

Example 11

Gel Formulation

| Ingredients | % w/w (Crude) |
|---|---|
| Chlorite Part (A) | |
| Natrosol 250H NF | 2.800 |
| Glycerin | 0.100 |
| EDTA, Na$_4$ (87%) | 0.400 |
| Sodium chlorite (80%) | 2.000 |
| Isopropyl alcohol anhydrous | 5.000 |
| Fragrance | 0.020 |
| Water | q.s. |
| Acid Part (B) | |
| Natrosol 250H NF | 2.400 |
| Potassium bisulfate anhydrous | 0.710 |
| Propionaldehyde | 0.070 |
| Glycerin | 8.000 |
| Pluronic F68 NF | 0.400 |
| Isopropyl alcohol anhydrous | 2.000 |
| Fragrance | 0.020 |
| Water | q.s. | pH of the Chlorite Part=Falls Within the Range of About 10.0 to about 11.5
pH of Acid Part=Range of about 2.10 to about 2.25, preferably about 2.20.
pH of Chlorite Part (A)+Acid Part (B) at 1:1 mixing ratio= range of 3.6 to 4.0, preferably 3.80.
The levels of chlorine dioxide generated after 2 minutes aging period is about 50 ppm. Due to opacity of the mixture, chlorine dioxide levels were measured by amperometric method using a platinum redox electrode at room temperature.

Example 12

Comparison of the Present Gel Composition at a pH of about 4.5 With Prior Art Composition of Davidson The present invention which also relates to gel formulations for topical delivery to a human or animal patient, employing a vicinal hydroxyl free aldehyde in combination with a salt of chlorite and an acid at an initial pH of about 4.5 was compared with the method and compositions described in U.S. Pat. No. 4,986,990 ("Davidson"). This example was performed merely to assure the inventor that the general discovery of the rate of formation of chlorine dioxide utilizing the claimed inventive compositions was readily translated to formulations which contained amounts of a gelling agent effective to gel the compositions.

Chlorine dioxide was generated using the present invention (propionaldehyde at a concentration of 0.0122M was used as the disproportionation agent for the present invention) and the above-referenced prior art method of Davidson (D-mannose was used as the disproportionation agent in the Davidson composition at a concentration of 0.0122M) in the following experiments, which were performed at room temperature under essentially identical conditions (initial sodium chlorite and disproportionation agent concentration). The initial pH was constant at about 4.5. Chlorine dioxide was generated by mixing equal amounts of parts A and B. Levels of chlorine dioxide were determined for each experiment by the following method.

For the purpose of accurate measurements, after parts A and B were mixed, after the indicated time periods, known quantities of the gel mixtures were placed in known volumes of deionized water and allowed to dissolve. The resulting aqueous mixtures were then evaluated spectrophotometrically for their chlorine dioxide contents, using a wavelength of 360 nm. Sodium chlorite levels were determined by iodometric titrations using 0.1N thiosulfate reagent. A separate titration was carried out, as a control, for quantification of sodium chlorite at time zero, which resulted in 0.839 percent sodium chlorite.

The following compositions were made:
For the present invention:

|  | % w/w |
|---|---|
| Part (A) | |
| Natrosol 250H NF | 2.800 |
| Sodium chlorite (80%) | 2.098 |
| EDTA, Na₄ (87%) | 0.400 |
| Isopropyl alcohol anhyd. | 5.000 |
| Water | 89.702 |
| Part (B) | |
| Natrosol 250H NF | 2.400 |
| Potassium bisulfate anhyd. | 0.680 |
| Propionaldehyde | 0.071 |
| Water | 96.849 |

For the Davidson Reference:

|  | % w/w |
|---|---|
| Part (A) as above | |
| Part (B) | |
| Natrosol 250H NF | 2.400 |
| Potassium bisulfate anhyd. | 0.680 |
| D-Mannose | 0.220 |
| Water | 96.700 |

Part (A) as set forth above was used to produce compositions according to the present invention and to replicate the composition of Davidson.

The results of the experiment appear in Tables 9 and 10, below.

TABLE 9

Chlorine Dioxide Generation

| | PPM Chlorine Dioxide Generated | |
|---|---|---|
| | After 2 Min. | After 10 Min. |
| Present Invention | 27 | 35 |
| Davidson Composition | ≦1 | 2 |

TABLE 10

Percent Levels of Sodium Chlorite Detected

| | After 2 Min. | After 10 Min. |
|---|---|---|
| Present Invention | 0.8310 | 0.7900 |
| Davidson Composition | 0.8386 | 0.8384 |

The results of this experiment indicate that the present invention produces unexpectedly greater quantities of chlorine dioxide compared to the Davidson compositions as was shown in the aqueous system. It is clear that the unexpected result produced by the combination of hydroxyl free aldehydes and sodium chlorite at an acidic pH in an aqueous system is clearly translatable to an aqueous system which includes a gelling agent. The modification in theology of gel compositions according to the present invention did not negate the enhanced generation of chlorine dioxide in compositions according to the present invention compared to the prior art methods of generating chlorine dioxide.

This invention has been described in terms of specific embodiments set forth in detail herein, but it should be understood that these are by way of illustration and the invention is not necesarily limited thereto. Modifications and variations will be apparent from the disclosure and may be resorted to without departing from the spirit of the inventions those of skill in the art will readily understand. Accordingly, such variations and modifications are considered to be within the purview and scope of the invention and the following claims.

I claim:

1. A gel composition comprising:
   (1) an aqueous solution comprising an aqueous soluble chlorite salt in solution with an acid selected from the group consisting of an aqueous soluble bisulfate salt, sulfamic acid, maleic acid, phosphoric acid, ethylenediaminetetraacetic acid, monosodium ethylenediaminetetraacetic acid salt and mixtures thereof in combination with an aldehyde disproportionation agent selected from the group consisting of glutaraldehyde, propionaldehyde and acetaldehyde, wherein (i) the combination of said chlorite salt, said acid and said aldehyde disproportionation agent is effective to produce chlorine dioxide in a concentration of at least about 5 parts per million within a period of about ten minutes or less, and (ii) said aqueous solution has an initial pH of about 2.5 to 4.5; and
   (2) a gelling agent in an amount effective to gel said aqueous solution,
   wherein said gel composition produces at least two times the concentration of chlorine dioxide after said period compared to a second composition identical to said gel composition except that an aldose disproportionation agent is substituted for said aldehyde disproportionation agent in said second composition at the same molar concentration said aldehyde disproportionation agent is included in said gel composition.

2. A composition according to claim 1 wherein said aqueous soluble bisulfate salt is selected from the group consisting of sodium bisulfate and potassium bisulfate.

3. The composition according to claim 1 wherein said chlorite salt is selected from the group consisting of potassium chlorite and sodium chlorite.

* * * * *